United States Patent [19]

Tsai

[11] Patent Number: 5,822,052
[45] Date of Patent: Oct. 13, 1998

[54] METHOD AND APPARATUS FOR COMPENSATING ILLUMINANCE ERROR OF A LIGHT SOURCE

[75] Inventor: Jenn-Tsair Tsai, Hsinchu, Taiwan

[73] Assignee: Nustek Systems, Inc., Hsinchu, Taiwan

[21] Appl. No.: 772,323

[22] Filed: Dec. 23, 1996

[51] Int. Cl.⁶ ............................ G02B 23/08; G02B 27/22; G02B 7/00; G91J 1/10
[52] U.S. Cl. ....................... 356/229; 250/208.1; 250/205; 358/406; 358/504; 358/475
[58] Field of Search ........................ 356/229; 250/208.1, 250/205, 214 C, 214 R, 214.4 AG, 504; 358/475, 484, 518, 520, 406

[56] References Cited

U.S. PATENT DOCUMENTS

| | | | |
|---|---|---|---|
| 4,680,644 | 7/1987 | Shirato et al. | 250/214 C |
| 5,212,376 | 5/1993 | Liang | 250/208.1 |
| 5,278,674 | 1/1994 | Webb et al. | 358/475 |
| 5,285,293 | 2/1994 | Webb et al. | 358/406 |
| 5,592,306 | 1/1997 | Cheng | 358/475 |
| 5,636,040 | 6/1997 | Tung | 358/475 |

*Primary Examiner*—Frank G. Font
*Assistant Examiner*—Jason D. Vierra-Eisenberg
*Attorney, Agent, or Firm*—Merchant, Gould, Smith, Edell, Welter and Schmidt

[57] ABSTRACT

A method and an apparatus for compensating illuminance error of a light source is adapted to be used in a transmission type scanner and utilizes the light signal directly transmitted from the light source to an image pickup device of the scanner without passing through any scanned object as an illuminance calibration reference to compensating illuminance error of the light source. The calibration light signal can be transmitted from the light source to the image pickup device through a light transmission region arranged beside a scanning region.

16 Claims, 6 Drawing Sheets

METHOD AND APPARATUS FOR COMPENSATING ILLUMINANCE ERROR OF A LIGHT SOURCE

FIELD OF THE INVENTION

The present invention relates to method and apparatus for compensating illuminance error of a light source, and more particularly to method and apparatus in conjunction with a scanner for automatically detecting and compensating the illuminance error of a light source to obtain a stable scanning quality.

BACKGROUND OF THE INVENTION

At present, the light source for an image scanner is generally a white fluorescent lamp, which can be classified as a cold cathode fluorescent tube (CCFT) and an ordinary fluorescent lamp. The common disadvantage of the above mentioned two light sources is shown in FIG. 1, where the illuminance of the light lamp will increase gradually when lighting up, and become stable after 4~5 minutes. Therefore, the lamp has to be warmed up before using in order to obtain a stable light source. However, even though the illuminance of the light is stable after warming up, there still exists about ±3%~±5% error. Furthermore, the illuminance of the lamp will be reduced for ageing, so that the charge coupled device (CCD) in the image scanner will sense an unstable light signal, and a transmission type scanner will generate a curtain-like image during scanning. Therefore, a light signal of uniform illuminance is required to improve the image scanning quality.

In conventional art, there exist some improvements of the light illuminance to increase the image scanning quality. For example, a standard light signal from a light source is coupled through an optical fiber to be fed into a charge coupled device, and then changed into a reference voltage signal. The image scanning signals will be compared with the reference voltage signal and compensated. The disadvantage of the above method is that the structure of the optical fiber compensating means is very difficult to be adjusted and costs too much, and can not improve effectively the image scanning quality of a transmission type scanner.

SUMMARY OF THE INVENTION

The major object of the present invention is to provide a method for compensating illuminance error of a light source by detecting illuminance of the light source to compensate an image scanning signal.

Another object of the present invention is to provide an apparatus for compensating illuminance error of a light source by detecting illuminance of the light source to compensate an image scanning signal.

According to the major object of the present invention, said method comprises the steps of: (a) providing an initial light signal; (b) detecting said initial light signal to obtain a detected light signal; (c) receiving said detected light signal to produce a reference light signal; (d) receiving said initial light signal for being projected to an object to obtain an object light signal and generate an image sensing signal; and (e) compensating said image sensing signal by said reference light signal.

According to the above idea, wherein in said step (a), said initial light signal is provided by a light lamp.

According to the above idea, wherein in said step (b), said detecting action is performed by an illuminance detecting means.

According to the above idea, wherein said illuminance detecting means is a region formed by a transparent material.

According to the above idea, wherein in said steps (c) and (d), said receiving actions are performed by an image sensing means.

According to the above idea, wherein said image sensing means is a charge coupled device (CCD).

According to the above idea, wherein in said step (e), said compensating action is performed by an illuminance compensating means.

According to the above idea, wherein said illuminance compensating means is a hardware circuit or a software program.

According to the above idea, wherein there further comprises a step: (f) receiving said initial light signal to generate a chrominance adjusting signal, and compensating chrominance of said image sensing signal by said chrominance adjusting signal.

According to the above idea, wherein said chrominance adjusting signal is generated by a chrominance detecting means.

According to the above idea, wherein said chrominance detecting means is a region formed by a white transparent material.

According to another object of the present invention, said apparatus comprises: an illuminance detecting means for receiving an initial light signal to generate a detected light signal; and an image sensing means for receiving said initial light signal for being projected to an object to obtain an object light signal to be transferred into an image sensing signal, and receiving said detected light signal for generating a reference light signal to compensate said image sensing signal.

According to the above idea, wherein said illuminance detecting means is a region formed by a transparent material.

According to the above idea, wherein said apparatus can be used in conjunction with a scanner.

According to the above idea, wherein said scanner is a transmission type scanner.

According to the above idea, wherein said illuminance detecting means is provided on a housing surface of said scanner.

According to the above idea, wherein said housing surface is a scanning window.

According to the above idea, wherein said illuminance detecting means is provided on a sheet which is placed in the optical path of said initial light signal.

According to the above idea, wherein said sheet is transparent.

According to the above idea, wherein there further comprises a chrominance detecting means.

According to the above idea, wherein said chrominance detecting means and said illuminance detecting means are placed on the same plane.

According to the above idea, wherein said chrominance detecting means is a region formed by a white transparent material.

According to the above idea, wherein said image sensing means is a charge coupled device (CCD).

According to the above idea, wherein there further comprises an illuminance compensating means for compensating said image sensing signal by said reference light signal.

According to the above idea, wherein said illuminance compensating means is one of a hardware circuit and a software program.

BRIEF DESCRIPTIONS OF THE DRAWINGS

The present invention can be better understood by the detailed descriptions of the following drawings, in which.

DETAILED DESCRIPTIONS OF THE PREFERRED EMBODIMENTS

A transmission type scanner is generally provided with a sheet on top of the scanner, and has the following two modes:

1. An adjusting window and a/a plurality of scanning regions are provided on said sheet;
2. An adjusting window is provided on the housing of the scanner, and a/a plurality of scanning region(s) is/are provided on said sheet.

Figure 1:
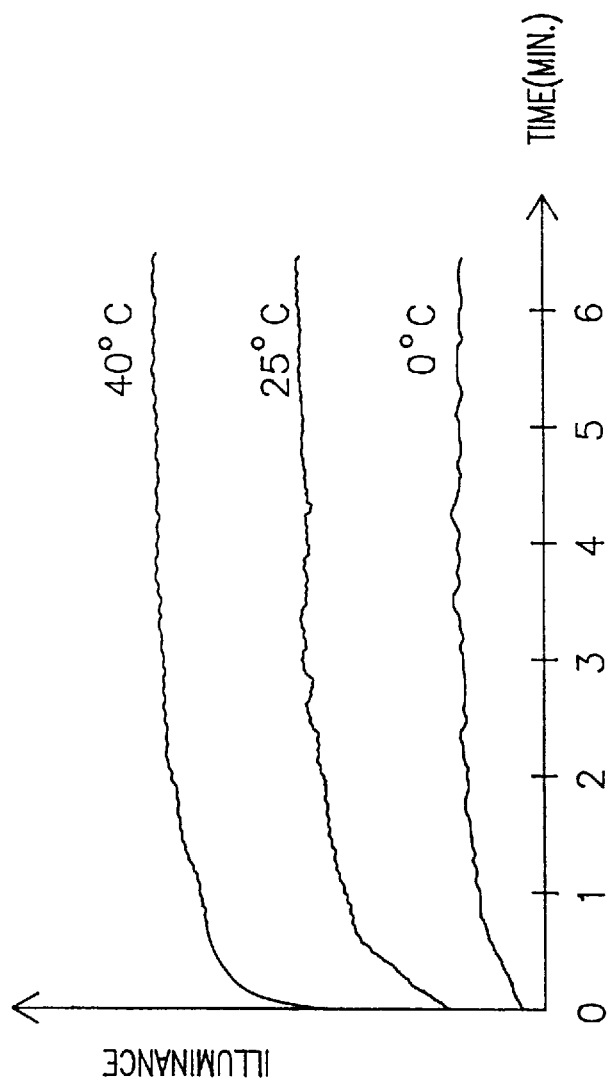
FIG. 1 is a relationship graph between the light illuminance and the preheating time of a lamp.
Figure 2A:
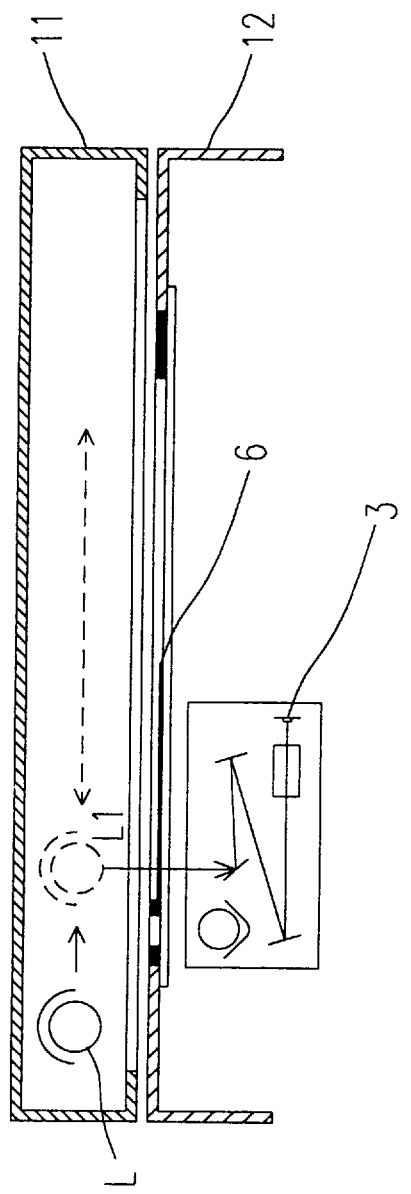
FIGS. 2A and 2B are schematic structure diagrams showing a preferred embodiment of the present invention.
Figure 2B:
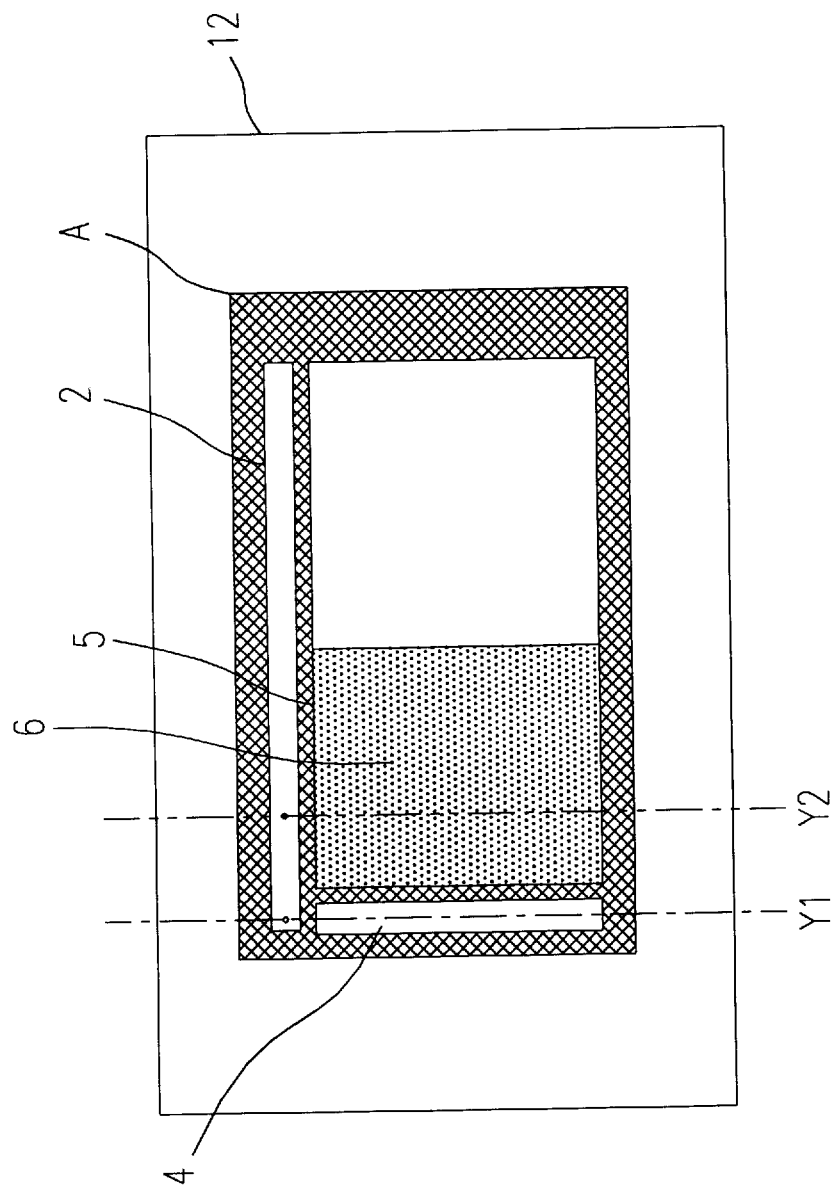

Please refer to FIG. 2A which is a schematic side cross-sectional view of a transmission type scanner according to the present invention, and FIG. 2B which is a top plane view of the lower housing of the scanner of FIG. 2A. The transmission type scanner 1 shown in FIGS. 2A and 2B includes a light source L mounted in an upper housing 11 for generating an initial light signal L1, and a sheet A having a long slit 2 and being placed on the top surface of a lower housing 12 of said transmission type scanner 1, wherein said slit 2 is a light transmission region serving as an illuminance detecting means, so that said initial light signal L1 can be transmitted through said slit 2 to produce a detected light signal to be transferred into an image sensing means 3, and then a reference light signal is generated for outputting. Another long slit 4 is provided on said sheet A and plated with a white transparent material to form another light transmission region serving as a chrominance detecting means for generating a chrominance adjusting signal. The initial light signal L1 will be received by some pixels of the CCD in the scanner for generating some reference voltages as the chrominance adjusting signal. The long slit 2 and said long slit 4 are perpendicular with each other. A scanning region 5 is used for projection of said initial light signal L1 onto an object 6 therein, and the light signal is transmitted through the object 6 to obtain an object light signal, and then received by the image sensing means 3 to generate an image sensing signal for outputting. Therefore, by means of said sheet, compensation of a light illuminance error and adjustment of the chrominance can be achieved without modifying hardware structure of the original scanner. Said sheet of the present invention can be used in conjunction with any transmission type scanner.

Figure 3A:
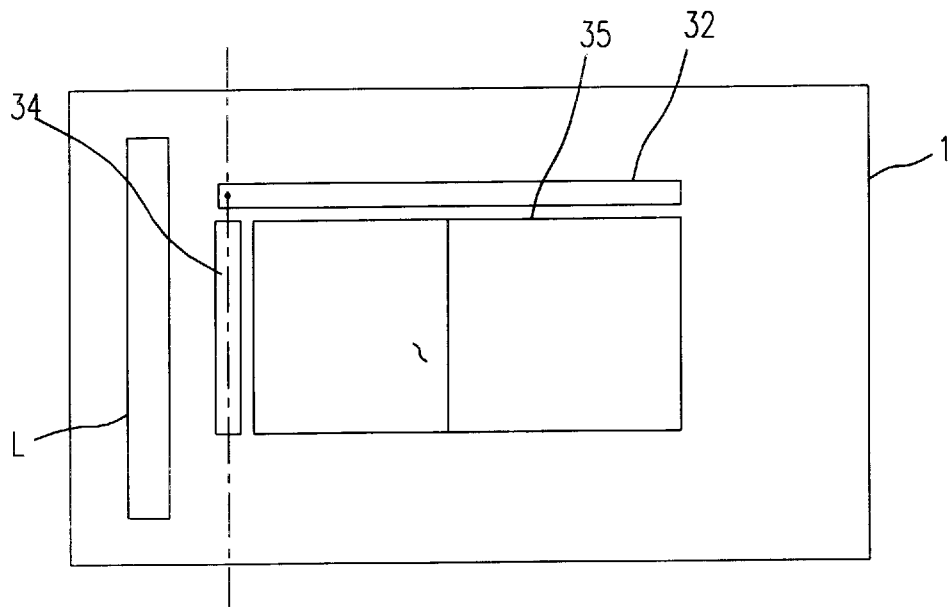
FIGS. 3A and 3B are schematic structure diagrams showing another preferred embodiment of the present invention.
Figure 3B:
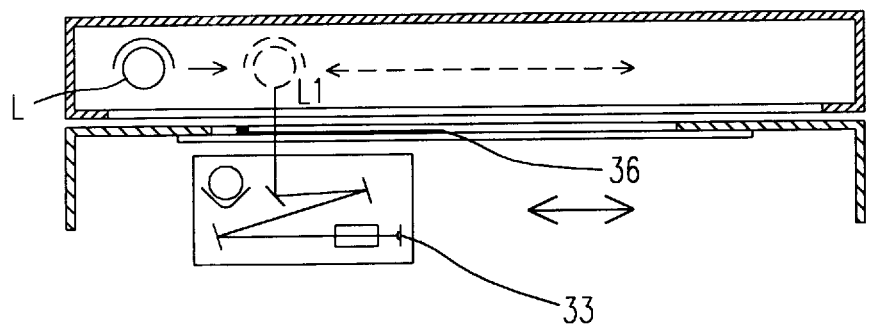

Please refer to FIG. 3A which is a schematic side cross-sectional view of another transmission type scanner according to the present invention, and FIG. 3B which is a top plane view of the lower housing of the scanner of FIG. 3A. The present invention can be implemented by providing a long slit 32 on a scanning window of said scanner housing, as shown in FIG. 3B, so as to form a light transmission region serving as an illuminance detecting means. The initial light signal L1 thus can be transmitted through said slit 32 to generate a detected light signal to be transferred to an image sensing means 33 to produce a reference light signal for outputting. Another long slit 4 provided on said scanning window is plated with a layer of white transparent material to form another light transmission region serving as a chrominance detecting means, so that said initial light signal L1 can be received by said chrominance detecting means to generate a chrominance adjusting signal. A scanning region 35 is used to let said initial light signal from said light source L be projected on an object 36 placed therein and then transmitted through said scanning region 35, so that an object light signal is obtained and received by the image sensing means 33 to generate an image sensing signal for outputting.

Figure 4:
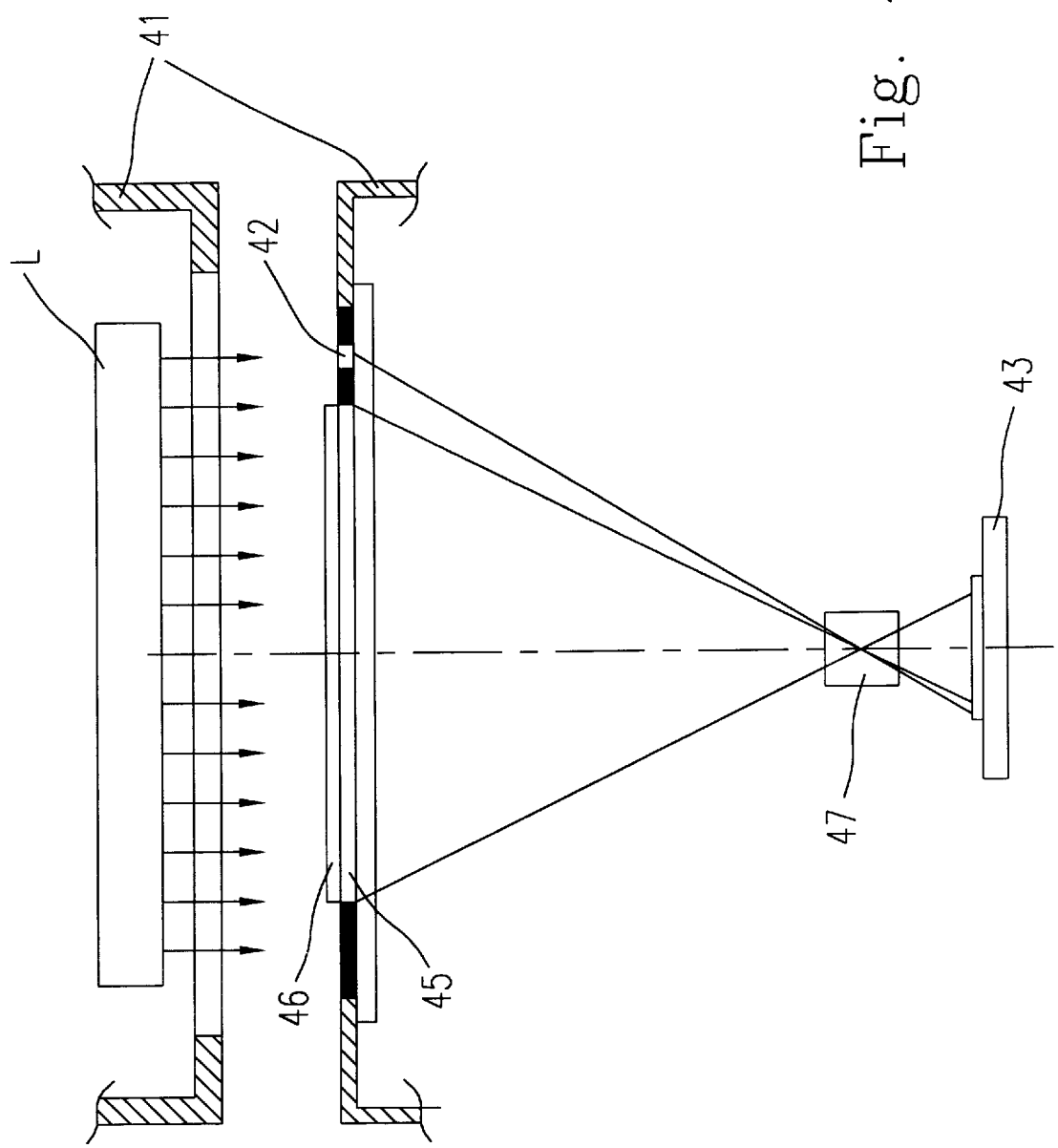
FIG. 4 is the schematic operating principle diagram of any of the preferred embodiments shown in FIGS. 2 and 3.

Please refer to FIG. 4, which is the schematic operating principle diagram of one of the preferred embodiments of the present invention, and comprises a housing 41 of a scanner, a lamp L, a light transmission region 42 as an illuminance detecting means, an image sensing means 43, a scanning region 45, an object 46, and a set of lens 47, wherein said lamp L is placed in an upper portion of said housing 41, and other elements are placed in a lower portion of said housing 41.

The lamp L of the present invention will provide an initial light signal L1 to be projected on the object 46, the light transmission region 42 and the chrominance detecting means to produce an object light signal, a detected light signal and a chrominance adjusting signal, respectively. Said object light signal, the detected light signal and the chrominance adjusting signal will be transmitted through a set of lens 47 to be transferred to the image sensing means 43. The image sensing means 43 is a charge coupled device which consists of a plurality of pixels. Each pixel will generate an amount of charges proportional to the sensed light intensity, and output sequentially the voltage transferred from said charges according to a series of pulses from a digital control circuit. Generally, the number of pixels in a charge coupled device will exceed the actual requirement, thus some pixels will remain unused during normal operation, which can be used for the detected light signal.

Having passed through said image sensing means, the above mentioned light signals will be amplified, biased, sampled and held, position processed and analog-to-digital converted to obtain an image sensing signal and a reference light signal, the image sensing signal will then be compensated by said reference light signal and said chrominance adjusting signal via an illuminance compensating means with a hardware circuit or software program thereof.

Figure 5:
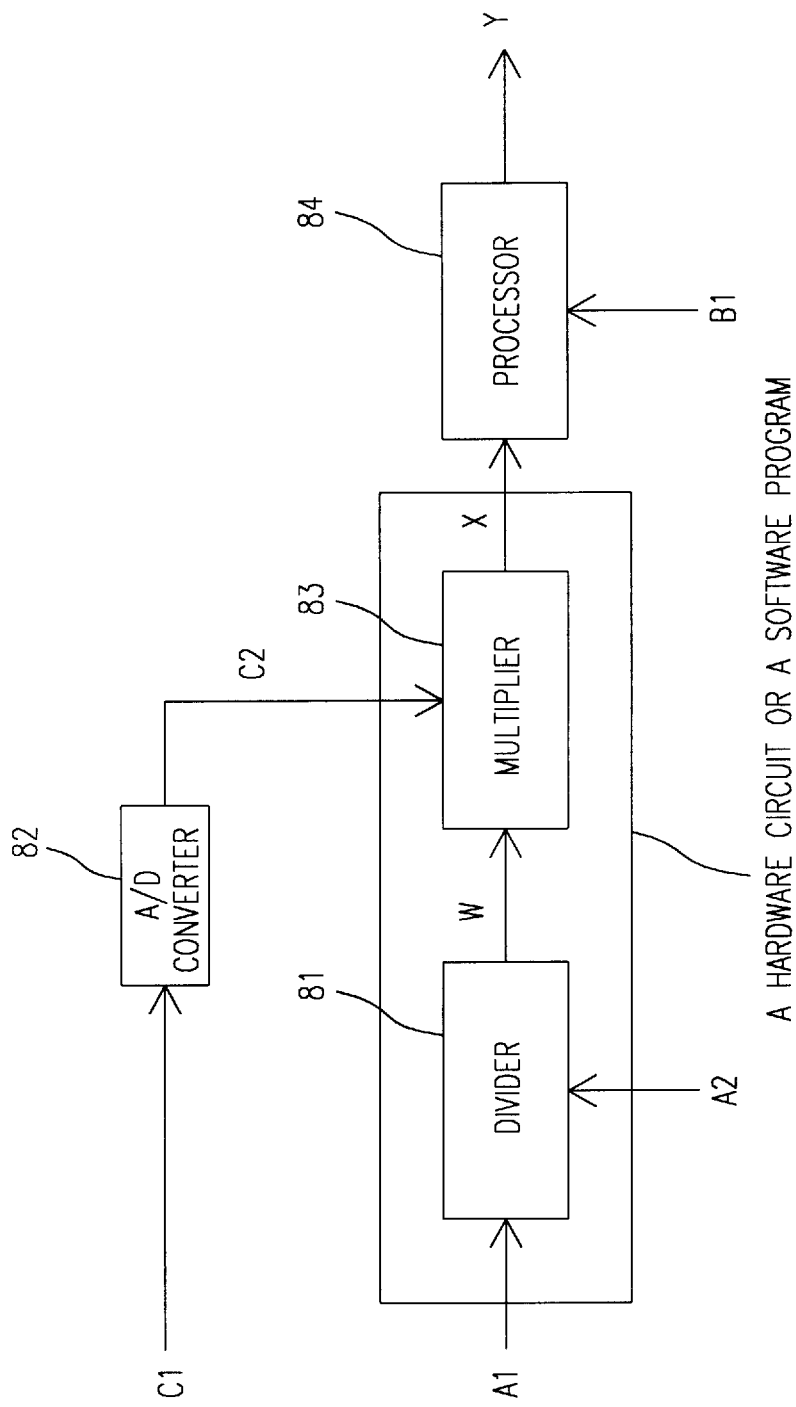
FIG. 5 is a flow chart illustrating the compensating method of any of the preferred embodiments shown in FIGS. 2 and 3.

Please refer to FIG. 5, whch is a flow chart illustrating the compensating method of the preferred embodiments of the present invention. Reference is also made to FIGS. 2A and 2B or FIGS. 3A and 3B. Y1 indicates the initial adjusting position of the lamp 1, and Y2 indicates a scanning position of the lamp L. The initial light signal L1 provided by the lamp L passes through the scanning window of the scanner and the object 36 to be transferred to an image sensing means 33 through a set of lens, so as to obtain a reference light signal A1 and a chrominance adjusting signal B1 at position Y1 and obtain a reference light signal A2 and an image sensing signal C1 at position Y2. The compensating method of the image sensing signal is as below:

1. The reference light signal A1 at position Y1 is compared with the reference light signal A2 at position Y2 to obtain a ratio W=A1/A2 by means of an divider 81;
2. The image sensing signal C1 at position Y2 is converted by an analog-to-digital converter 82 to obtain an image sensing signal C2;

3. The image sensing signal C2 is multiplied by said ratio W by means of a multiplier 83 to compensate the image sensing signal C2, so that the image sensing signal C2 maintains the light intensity at the adjusting position Y1 and obtain an image sensing signal X, wherein X=C2×W=C2×(A1/A2), so that the light illuminance error of the image sensing signal X is compensated;

4. The image sensing signal X is operated with the chrominance adjusting signal B1 obtained when lamp L is at adjusting position Y1 by a processor 84, so as to get an image sensing signal Y which is an illuminance and chrominance adjusted signal;

5. Similarly, a plurality of image sensing signals are obtained at position Y3, Y4, . . . , and are compensated by the process of the above steps 1–4.

6. Preferably, the illuminance of the scanning image can be increased after processing the above steps in order to improve the quality of the picture.

The above compensating process can be performed by an illuminance compensating means which is a hardware circuit or a software program.

Summing up the above, the present invention can improve the image scanning quality without preheating the machine for a few minutes when the illuminance of the light source is unstable. The illuminance and chrominance detecting means of the present invention are very easy to manufacture and assemble, thereby has great applicability in the art.

The above embodiments can be modified by any skillful person in the art without departing the spirit and scope of the accompanying claims.

What is claimed is:

1. An apparatus adapted to be used for correcting a detected image of an object by compensating illuminance error of a light source, comprising:

a light transmission region arranged in a plane where said object is placed, and located beside said object for receiving an initial light signal from said light source to generate a detected light signal;

an image sensing means for receiving an object light signal which is generated after said initial light signal is projected to said object and transformed into an image sensing signal by said image sensing means, and receiving said detected light signal which is transformed into a reference light signal by said image sensing means; and an illuminance compensating means for compensating said image sensing signal according to said reference light signal.

2. The apparatus according to claim 1, wherein said light transmission region is a region formed by a transparent material.

3. The apparatus according to claim 1, wherein said apparatus is used in conjunction with a scanner.

4. The apparatus according to claim 3, wherein said scanner is a transmission type scanner.

5. The apparatus according to claim 4, wherein said light transmission region is provided on a housing surface of said scanner.

6. The apparatus according to claim 5, wherein said housing surface is a scanning window having a scanning region for placing said object, and said light transmission region is arranged beside said scanning region.

7. The apparatus according to claim 4, wherein said light transmission region is provided on a sheet which is placed on a housing surface of said scanner and patterned to have a scanning region for placing said object, and said light transmission region is arranged beside said scanning region.

8. The apparatus according to claim 1, wherein said image sensing means is a charge coupled device (CCD).

9. The apparatus according to claim 1, wherein said illuminance compensating means is one of a hardware circuit and a software program.

10. A transmission type scanner, comprising:

an upper housing accommodating therein a light source for generating an initial light signal; and a lower housing having thereon a scanning region for placing an object to be scanned; a first light transmission region arranged in the same plane with said scanning region, and located beside said scanning region for receiving said initial light signal to generate a detected light signal; and a second light transmission region arranged in the same plane with said scanning region, and located beside said scanning region for receiving said initial light signal to generate a chrominance adjusting signal;

wherein said lower housing further accommodates therein an image sensing means for receiving an object light signal which is generated after said initial light signal is projected to said object and transformed into an image sensing signal by said image sensing means, receiving said detected light signal which is transformed into a reference light signal by said image sensing means, and receiving said chrominance adjusting signal which is transformed into a reference color signal; and an image data processing means for processing said image sensing signal to realize an image of said object, and compensating said image sensing signal according to said reference light signal and said reference color signal.

11. The scanner according to claim 10, wherein said first and said second light transmission regions and said scanning region are provided on a top surface of said lower housing.

12. The scanner according to claim 10, wherein said first and said second light transmission regions and said scanning region are provided on a sheet which is placed on a top surface of said lower housing.

13. The scanner according to claim 10, wherein said first transmission region is a slit region formed by a transparent material.

14. The scanner according to claim 10, wherein said second transmission region is a slit region formed by a white transparent material.

15. The scanner according to claim 10, wherein said image sensing means is a charge coupled device (CCD).

16. The scanner according to claim 10, wherein said image data processing means is one of a hardware circuit and a software program.

\* \* \* \* \*